US009524142B2

United States Patent
Grothe et al.

(10) Patent No.: US 9,524,142 B2
(45) Date of Patent: Dec. 20, 2016

(54) SYSTEM AND METHOD FOR PROVIDING, GESTURE CONTROL OF AUDIO INFORMATION

(71) Applicant: HONEYWELL INTERNATIONAL INC., Morristown, NJ (US)

(72) Inventors: Steve Grothe, Cave Creek, AZ (US); Aaron Gannon, Anthem, AZ (US); John Foster, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 165 days.

(21) Appl. No.: 14/224,370

(22) Filed: Mar. 25, 2014

(65) Prior Publication Data

US 2015/0277848 A1 Oct. 1, 2015

(51) Int. Cl.
| | |
|---|---|
| *G08C 23/04* | (2006.01) |
| *G06F 3/16* | (2006.01) |
| *G06F 3/01* | (2006.01) |
| *B64D 43/00* | (2006.01) |

(52) U.S. Cl.
CPC ............. *G06F 3/162* (2013.01); *G06F 3/017* (2013.01); *B64D 43/00* (2013.01); *G08C 23/04* (2013.01); *G08C 2201/40* (2013.01)

(58) Field of Classification Search
CPC .......... G06F 3/162; G06F 3/017; B64D 43/00; G08C 23/04; G08C 2201/40
USPC ....................................................... 340/4.42
See application file for complete search history.

(56) References Cited

U.S. PATENT DOCUMENTS

| | | | |
|---|---|---|---|
| 6,574,600 B1* | 6/2003 | Fishman ................ | G06Q 40/06 704/260 |
| 2008/0059578 A1* | 3/2008 | Albertson ............... | G06F 3/016 709/204 |
| 2009/0066722 A1* | 3/2009 | Kriger .................... | G06Q 30/02 345/619 |
| 2009/0109036 A1* | 4/2009 | Schalla .............. | B64D 11/0015 340/573.1 |
| 2009/0279869 A1* | 11/2009 | Ogawa ................. | G11B 27/034 386/248 |
| 2010/0137015 A1* | 6/2010 | Blanco ................... | H04W 4/10 455/518 |
| 2011/0090407 A1 | 4/2011 | Friedman | |
| 2011/0181510 A1 | 7/2011 | Hakala et al. | |
| 2011/0296353 A1* | 12/2011 | Ahmed .................. | G06F 3/017 715/848 |
| 2012/0110517 A1 | 5/2012 | Sparks et al. | |
| 2012/0124516 A1 | 5/2012 | Friedman | |

(Continued)

OTHER PUBLICATIONS

Reissner, U.; Gestures and Speech in Cars; Department of Informatics Technische Universitat Munchen, Mar. 28, 2007.

(Continued)

*Primary Examiner* — Steven Lim
*Assistant Examiner* — Mancil Littlejohn, Jr.
(74) *Attorney, Agent, or Firm* — Lorenz & Kopf, LLP (57) ABSTRACT

A 3D gesture based interface for controlling audio information in flight deck applications is provided. The system and method utilize a set of simple, intuitive 3D gestures, and unburden the pilot of searching for specific audio device controls. The system and method are intuitive and enable the pilot to quickly silence or subdue non-essential audio information, before interfering with essential audio information.

17 Claims, 4 Drawing Sheets

(56) References Cited

U.S. PATENT DOCUMENTS

2013/0066526 A1* 3/2013 Mondragon ............. G09G 5/00
  701/48
2013/0162513 A1 6/2013 Ronkainen

OTHER PUBLICATIONS

Amit Nishikant Kawalkar, et al.; System and method for interacting with a touch screen interface utilizing a hover gesture controller; filed Feb. 26, 2013, U.S. Appl. No. 13/777,737.
Amit Nishikant Kawalkar; System and method for providing an ergonomic three-dimensional, gesture based, multimodal interface for use in flight deck applications; filed Jan. 30, 2014, U.S. Appl. No. 14/168,426.
EP extended search report for EP 15158126.1-1810 dated Feb. 6, 2015.
EP Examination Report for EP 15158126.1-1810 dated Dec. 21, 2015.

* cited by examiner

FIG. 4

SYSTEM AND METHOD FOR PROVIDING, GESTURE CONTROL OF AUDIO INFORMATION

TECHNICAL FIELD

Embodiments of the subject matter described herein relate generally to avionics communications systems. More particularly, embodiments of the subject matter described herein relate to a system and method for providing a three-dimensional (3D) gesture based interface for controlling audio information in flight deck applications.

BACKGROUND

Pilots are responsible for monitoring a substantial amount of information during flight operations. In addition to the extensive amount of visual information provided by avionics display systems, there are multiple sources of flight deck audio information. For example, flight deck audio information may come from external or internal sources (e.g. radios, intercoms, and the like) and includes radio communications from multiple radios, directions, verbal warnings, alerts, etc. One or more audio devices convert audio data into audio information in response to system audio commands. Examples of audio devices that may be found in an aviation system include radios, intercoms, and the like. The various audio devices are generally independent, each having a dedicated mechanism to silence or cancel the conversion of audio data into audio information (also referred to as the generation of audio information); the mechanism to silence or cancel the generation of audio information may be a cancel button, a volume control, a select button, or the like.

Independent audio devices occasionally generate audio information at the same time, interfering with each other and inhibiting comprehension. In response to overlapping components of audio information, a pilot or crew may reduce the sound from a given audio device via a volume control knob, or other dedicated silence or cancel mechanism, or request that audio information be repeated. Searching the control panel for dedicated controls and/or requesting that information be repeated consumes time and increases cognitive workload.

During a complex avionics operation, an increase in cognitive workload and/or an increase in the time required to comprehend all components of audio information is especially undesirable. Therefore, a system or method that enables a pilot to quickly silence or subdue non-essential audio information is desirable. In particular, enabling the pilot to silence or subdue the non-essential audio information with one or more intuitive gestures is desirable.

In view of the foregoing, it would be desirable to provide a 3D gesture based interface for controlling audio information in flight deck applications. The desired system and method would improve upon currently available 3D gesture recognition interfaces that generally employ hand movements. As referenced herein, a gesture has specific motion dynamics and includes one or more static or dynamic components of a user's palm and fingers. By adding a set of simple, intuitive 3D gestures to generate audio commands and apply them to audio devices, a desirable system unburdens the pilot of searching the control panel for silence or cancel mechanisms for a given audio device. The desirable system is intuitive and enables a pilot to quickly silence or subdue non-essential audio information before the non-essential audio information interferes with essential audio information. A simple, intuitive gesture control for audio information decreases cognitive workload, and enhances the user's overall experience.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method is provided for gesture controlling at least one audio device in an aircraft. The position and movement of a user's arm and hand relative to a valid interaction volume are detected. The method recognizes when a gesture performed within a valid interaction volume indicates a valid audio control gesture. Audio control commands are generated consistent with the valid audio control gesture. The audio control command is then applied to the at least one audio device.

Also provided is a system for gesture controlling at least one audio device in an aircraft. The system includes a source of gesture interaction rules, a sensor, and a processor. The processor is coupled to the audio device, the source of gesture interaction rules, and the sensor. The processor is configured to (a) detect a position and movement of a user's arm and hand relative to a valid interaction volume, (b) recognize when a gesture performed within a valid interaction volume indicates a valid audio control gesture, and (c) determine an audio control command consistent with the valid audio control gesture. The audio device is configured to generate audio information in accordance with the audio control command.

A method for gesture controlling at least one audio device in an aircraft is also provided. A valid interaction volume based on the position and location of at least one sensor is created. The method recognizes when the static and dynamic movements of the user's palm and fingers within the valid interaction volume indicate a valid audio control gesture. An audio command is determined that is consistent with the valid audio control gesture and consistent with a predetermined audio data priority scheme. Audio information is generated by the at least one audio device in accordance with the audio control command.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following detailed description and claims when considered in conjunction with the following figures, wherein like reference numerals refer to similar elements throughout the figures, and wherein:

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Disclosed herein is 3D gesture based interface for controlling audio devices. This interface is herein referred to as "gesture controller". At least one sensor is coupled to a processor in the gesture controller. The gesture controller performs multiple duties; it detects the location of the pilot's hand and adjusts an associated valid sensing volume accordingly, and it interprets gestures by detecting position and motion of individual fingers and the palm, as described hereinbelow. The gesture controller enables users or developers to interact with an avionics system to activate control functions without making physical contact with the system. This interface extends the system beyond the limits of a particular operating system or application to which the user's inputs are directed. Presented herein for purposes of explication are certain exemplary embodiments illustrating how the gesture controller may be employed. For example, the embodiment of a gesture controller suitable for use in controlling audio information in aviation applications will be discussed.

The embodiment described herein is merely an example and serves as a guide for implementing the novel systems and method herein on any user interface in any industrial, commercial, aviation, or consumer electronics application. As such, the examples presented herein are intended as non-limiting.

Figure 1:
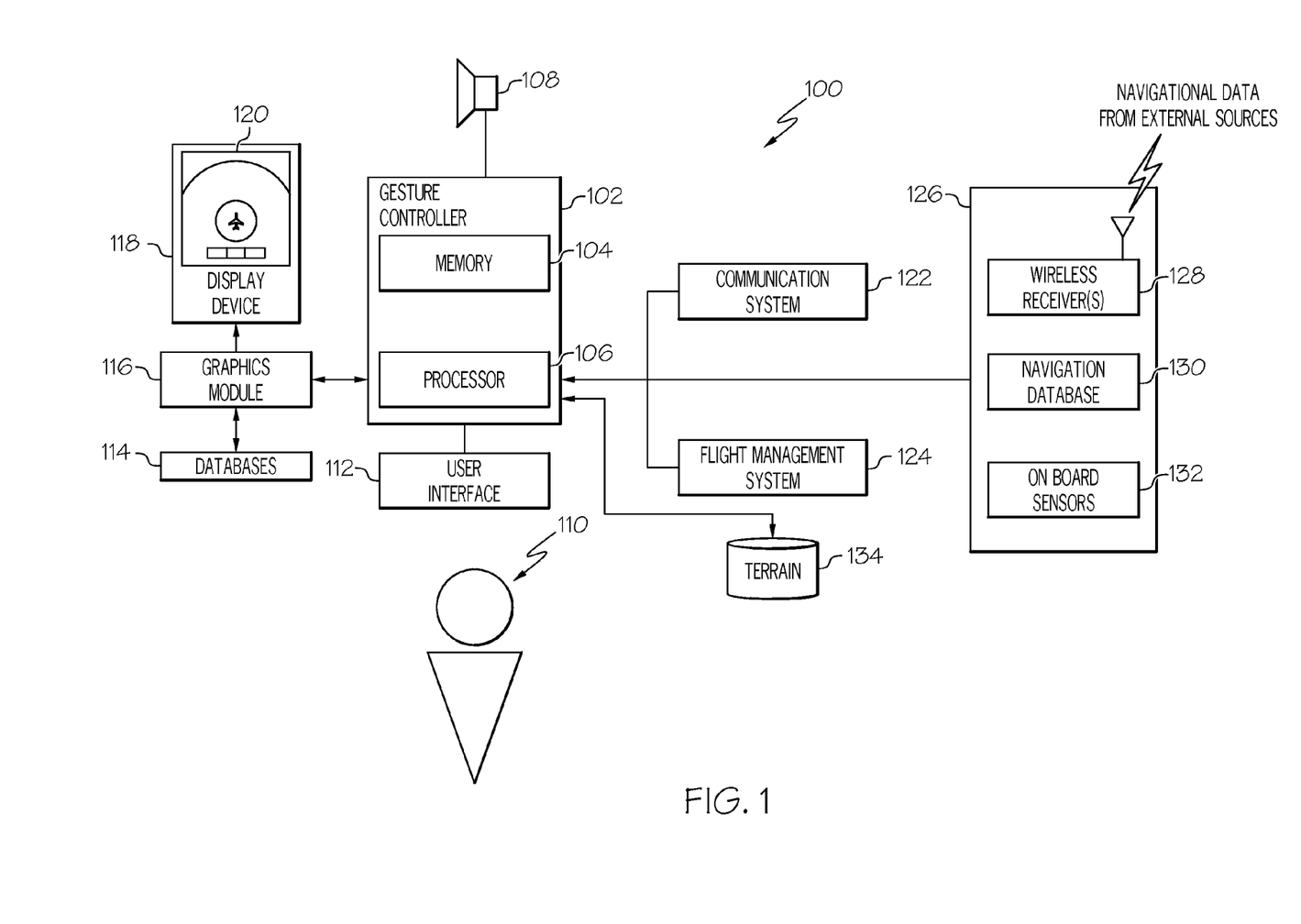
FIG. 1 is a block diagram of an aircraft cockpit system including a display and a gesture controller.

FIG. 1 is a block diagram of an aircraft cockpit system including a display and a gesture controller. Aircraft cockpit system 100 includes a gesture controller 102, comprising a memory module 104 and a processor 106, coupled to at least one audio device 108. A user 110 interacts with the aircraft cockpit system 100 via one or more user interfaces 112, which are coupled to the gesture controller 102. The gesture controller 102 is coupled to a graphics module 116, which drives display device 118 to produce display 120. One or more databases 114 may be coupled to the graphics module 116. In addition, the gesture controller 102 is coupled to a communication system 122, a flight management system 124, and a navigation system 126. The processor 106 and memory module 104 within the gesture controller 102 perform the gesture interaction parser operations that are discussed in FIG. 4. A more detailed description of the various components in aircraft cockpit system 100 follows.

Audio device 108 may be one or more devices suitable for converting audio data into audio information in the form of warnings, directions, sounds or verbal information. The audio device 108 responds to audio commands by converting audio data into audio information. Audio data may come from any combination of sources coupled to gesture controller 102, such as navigation system 126, the communication system 122, the flight management system 124, or other sources within the aircraft cockpit system 100 that are configured to generate audio data. Example audio devices include radios, intercoms, sirens and horns.

The navigation system 126 includes one or more wireless receivers 128, a navigation database 130, and onboard sensors 132. Wireless receivers 128 receives wireless information from sources such as the runway awareness and advisory system (RAAS), instrument landing system (ILS), traffic collision avoidance system (TCAS) and Terrain Avoidance and Warning System (TAWS), weather data information sources, and the like.

The processor 106 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 106 is coupled to at least one memory module 104 that may include memory devices such as RAM (random access memory) and/or ROM (read-only memory). The program instructions that control the processor 106, the operating system software, the various operating mode software routines and various operational parameters, and the software executing the exemplary embodiment may be stored in various combinations of RAM and/or ROM the memory module 104. In addition to the aforementioned instructions and parameters stored in the memory, the gesture interaction model and rules discussed hereinbelow are stored in the memory module 104. It will be appreciated that this is merely exemplary of one scheme for storing operating system software and software routines, and that various other storage schemes may be implemented.

The memory devices included in memory module 104 may be realized as RAM memory, flash memory, EPROM memory, EEPROM memory, registers, a hard disk, a removable disk, a CD-ROM, or any other form of storage medium known in the art. In this regard, the memory devices can be coupled to the processor 106 such that the processor 106 can read information from, and write information to, the memory devices. In the alternative, memory devices may be integral to the processor 106. As an example, the processor 106 and the memory module 104 may reside in an ASIC. In practice, a functional or logical module/component of the aircraft cockpit system 100 might be realized using program code that is maintained in the memory devices. For example, the memory devices can be used to store data utilized to support the operation of the aircraft cockpit system 100, as will become apparent from the following description.

No matter how the processor 106 is specifically implemented, it is in operable communication with the communication system 122, flight management system 124 and navigation system 126. The processor 106 is coupled to receive various types of avionics-related data from the onboard sensors 132, navigation database 130, and the external navigational data sources via the wireless receivers 128. The processor 106 is configured, in response to avionics-related data, to selectively retrieve terrain data from one or more of the terrain databases 134 and navigation data from one or more of the navigation database 130, and to generate associated systems commands. For example, the processor 106 supplies appropriate display commands to the display device 118, and in response, display device 118 selectively renders various types of textual, graphic, and/or iconic information. Additionally, processor 106 coordinates data and signals within gesture controller 102, such that gesture controller 102 supplies appropriate audio commands to the one or more audio devices 108, and in response, the one or more audio devices 108 generate audible information in the form of alerts, verbal information, sounds, warnings, etc.

The terrain databases 134 include various types of data representative of the terrain over which the aircraft is flying, and the navigation database 130 include various types of navigation-related data. The onboard sensors 132 may be implemented using various types of inertial sensors, systems, and or subsystems, now known or developed in the future, for supplying various types of inertial data, for example, representative of the state of the aircraft including aircraft speed, heading, and altitude. The navigation system 126 also receives information that provides aircraft with horizontal (or localizer) and vertical (or glide slope) guidance just before and during landing and, at certain fixed points, indicates the distance to the reference point of landing on a particular runway, and GPS broadcast signals transmitted by the constellation of GPS satellites (not illustrated) orbiting the earth.

The display device 118, as noted above, in response to commands supplied from the processor 106, selectively renders various textual, graphic, and/or iconic data, and thereby supplies visual feedback to the user 110. It will be appreciated that the display device 118 may be implemented using any one of numerous known display devices suitable for rendering textual, graphic, and/or iconic information in a format viewable by the user 110. Non-limiting examples of such display devices include various multifunction displays (MFD), Near to Eye (NTE), projection displays, cathode ray tube (CRT) displays, and flat screen displays such as LCD (liquid crystal display) and TFT (thin film transistor) displays. The display device 118 may additionally be implemented as a screen mounted display, or any one of numerous known technologies. It is additionally noted that the display device 118 may be configured as any one of numerous types of aircraft flight deck displays. For example, it may be configured as a multifunction display, a horizontal situation indicator, a vertical situation indicator, or the like. In the depicted embodiment, however, at least one display device 118 is configured as a primary flight display (PFD).

In operation, the display device 118 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 118 is suitably designed to process data obtained from the sources of flight status data in the manner described in more detail herein.

The user interfaces 112 include at least one three dimensional (3D) sensor that may be a potentiometer, optical technology, LIDAR, SONAR, electric field imaging sensor, or a similar device. At least one 3D sensor may be used to detect various relevant data, such as, but not limited to: the position and location of a palm and fingers, gestures made by the palm and fingers, and the position and location of a user's hand from the flight deck dashboard. The 3D sensor(s) provide relevant data to the gesture controller 102, as is described in more detail hereinbelow. The user interfaces 112 may also include any combination of one or more of the following: a keypad, touchpad, keyboard, mouse, touchscreen, joystick, knob, microphone, speech recognition or another suitable device adapted to receive input from a user.

Gesture controller 102 processes commands, system information, audio data and user input, and generates audio commands suitable for controlling one or more audio devices 108. When audio commands are applied to audio devices, the audio device responds by generating audio information or silencing audio information accordingly.

Figure 2:
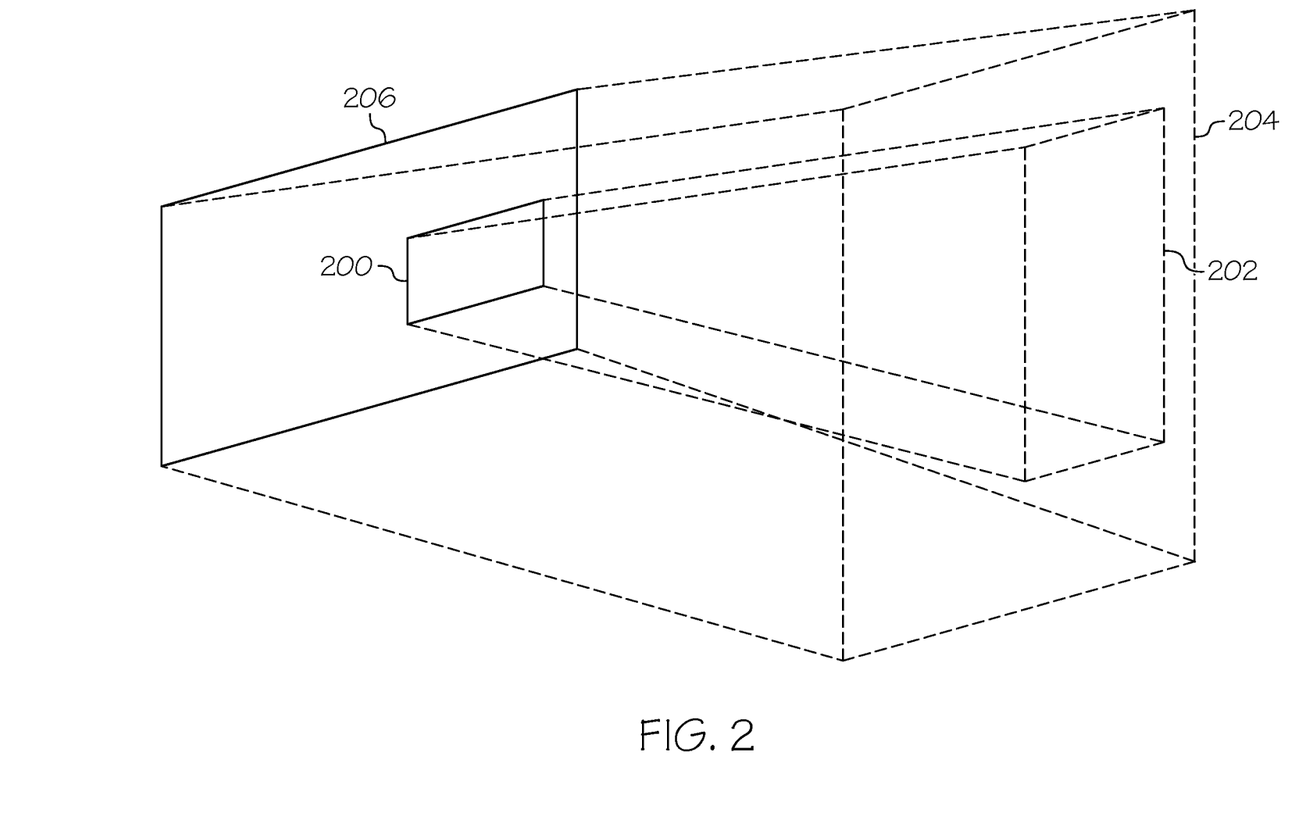
FIG. 2 illustrates an isometric view of a volumetric computing solution.

FIG. 2 illustrates an isometric view of a volumetric computing solution. The at least one three dimensional (3D) sensor included in the user interfaces 112 is employed in the generation of a volume of interaction to be used in gesture control of the gesture controller 102. An exemplary embodiment of a volume of interaction has been projected into the space in front of the display 206, however it can be appreciated that the volume of interaction does not require an associated display. In the exemplary embodiment, display device 118 renders region 200 that controls functions of the aircraft as described above. As such, volume 202 represents the 3D gesture interaction volume corresponding to region 200. In the embodiment shown, volume 202 is a subset of an entire volume 204 that corresponds to display 120. Any generated interaction volume, such as volume 202, may be utilized to obtain input/control for more than one audio source, and the interaction volumes may be generated independent of a display. The proposed volumetric computation engine divides the sensed user interactions according to the location of one or more users, and the boundaries of one or more volumes of interaction such as 202. In some embodiments, a volume of interaction may be generated for a right hand and for a left hand. The proposed volumetric computation engine is described in U.S. patent application Ser. No. 13/777,737 filed Feb. 26, 2013 entitled "SYSTEM AND METHOD FOR INTERACTING WITH A TOUCH SCREEN INTERFACE UTILIZING A HOVER GESTURE CONTROLLER," and assigned to the instant assignee, the teachings of which are hereby incorporated by reference.

For the sake of simplification, sensor volumes and valid 3D gesture interaction volumes are drawn cubically, as if their boundaries are distinct. In practice, and sensor volumes and valid 3D interaction volumes have edges that are less defined and may taper off instead of being distinctly bounded.

Figure 3:
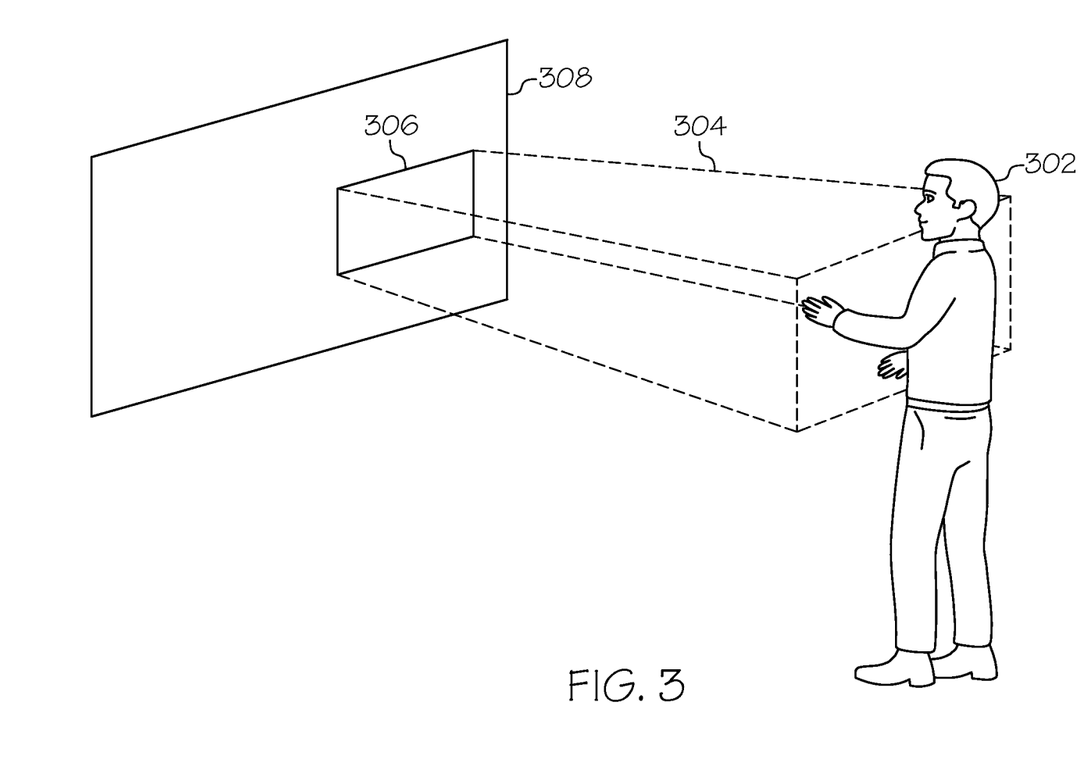
FIG. 3 illustrates a user interacting with a volume in the volumetric computing system of FIG. 2.

FIG. 3 illustrates a user interacting with a sensing volume such as the volumetric computing system of FIG. 2. In FIG. 3, User 302 is validly interacting within 3D interaction volume 304 that corresponds to region 306. User gestures that occur outside of display 308 do not generate a corresponding region 306 or corresponding valid 3D interaction volume 304, and are therefore not detected and converted into system commands. The gesture controller 102 may generate private valid 3D gesture interaction volumes for each user, for example, a private gesture interaction volume for the captain and a private gesture interaction volume for the first officer, or may generate one or more shared interaction volumes. In some embodiments, a user may have an interaction volume for each hand, and for example, a right hand may be utilized to control a directional region (such as forward or aft), or the right audio channel and the left hand may be utilized to control a separate directional region (such as forward or aft), or the left audio channel. In another example, the hand could be cupped by the ear to gesture an increase in audio. The exemplary embodiment of gesture controller 102 enables users to interact with the flight deck systems utilizing a valid interaction volume associated with a display, however, the interaction volumes may be generated without an associated display. Gesture recognition is described in more detail hereinbelow.

During gesture recognition, the pilot's palm and fingers are tracked in real-time. An abbreviated discussion follows, and the detailed discussion may be found in U.S. patent application Ser. No. 14/168,426 filed Jan. 30, 2014 entitled "A SYSTEM AND METHOD FOR PROVIDING AN ERGONOMIC THREE-DIMENSIONAL, GESTURE BASED, MULTIMODAL INTERFACE FOR USE IN FLIGHT DECK APPLICATIONS," and assigned to the instant assignee, the teachings of which are hereby incorporated by reference. As the gesture is performed, aspects of the static and dynamic features of the palm and fingers are compared to rules in a three dimensional (3D) gesture interaction model, and recognized as whole or partial intentional gesture input where appropriate. The whole and partial intentional gestures are compared to a gesture interaction model, which parses and combines intentional gesture input into components of a complete gesture in this manner. The components of a complete gesture are described in more detail below. The complete gestures are compared to system command descriptors prior to generating associated system commands.

Gesture recognition is initiated upon the matching of conformal cues corresponding to the pilot's intent to use 3D gestural interaction. If pilot gesture input is within a previously computed valid interaction volume, such as 3D interaction volume 304, variables referred to as valid gesture input and associated Gesture ID and Validity Quality data are generated. The Validity Quality data is a variable used to indicate gesture recognition success; i.e. system designers may adjust Validity Quality, for example, to indicate how the gesture is being performed with respect to the computed valid interaction volume. The library of the audio control gesture rules may include static and dynamic temporal requirements used to determine the intentionality of a gesture. Temporal requirements are sometimes considered "hold" times or "dwell" times, and associated information is used in the evaluation of Gesture ID and Validity Quality. In this manner, the gesture controller 102 identifies and validates the user's interaction intentions, and supports any associated user feedback via the display device 118, as well as generating system commands that drive the one or more audio devices 108.

In accordance with an embodiment, audio control gestures are gestures that are used to generate audio commands to silence, subdue, or restart audio data are deliberately chosen to be intuitive, and are composed of a set of rules. For example, holding up the index finger in a gesture commonly used to indicate "wait," or holding up an open hand in a gesture commonly used to indicate "stop." These same gestures are commonly used between individuals in the course of conversation and social settings. Likewise, gestures such as holding up a cupped hand to the ear in an attempt to hear, or a hand extended with the palm up and the fingers moving toward the gesturer in a motion commonly used to encourage another to come forward may be used to restart audio data.

The exemplary embodiment enables a user to associate a given audio control gesture with one or more specific audio devices (target audio devices) according to a priority scheme described in more detail hereinbelow. Such audio control gestures may target a single device or a plurality of devices (e.g., according to a directional priority or regional priority, according to a left or right hand, etc.). In an embodiment, the user may optionally employ a "timed silence" by setting a predetermined amount of time for an audio silence command to endure. In such an embodiment, when the predetermined amount of time has elapsed, the audio silence command ends, and the target audio device restarts generation of audio information. Utilizing the timed silence option relieves a user of performing an additional restart gesture to prompt the audio device to restart generation of audio information.

The 3D gesture interaction model introduced above, and stored in memory module 104, includes a library of the audio control gesture rules. The 3D gesture interaction model contains individual gesture components (gesture components may include any of the following: entry point, gesture start, gesture body, and gesture end); each gesture component may have definite preconditions, visual and aural feedback, and a next expected gesture component. The gesture interaction model provides 3D gesture interaction rules for each system command that is supported by gesture interaction. System commands that control audio data (i.e., audio commands) are included within the gesture interaction rules.

In the exemplary embodiment, an "initiate gesture" provided within the 3D gesture interaction volume commences gesture interaction. Gesture controller 102 proceeds with recognition of conformal cues corresponding to the pilot's intent to use 3D gestural interaction. Subsequent to initiating the gesture, the user performs an audio control gesture as described hereinabove. During the "perform audio control" state, the user gestures and the system processes the corresponding task, driving the one or more audio devices 108 accordingly. While the user is performing the gesture input, conformal visual feedback may be provided. In the exemplary embodiment, when a user desires to stop gesture interaction, the user performs a stop gesture. Initiate gestures and stop gestures may not be present in all embodiments, or may vary from one embodiment to another, the 3D gesture interaction model introduced above, and stored in memory module 104, includes a library of the audio control gesture rules for each embodiment.

In the system response state, visual and/or audio feedback may be provided to reflect the successfully recognized, ongoing, or completed gesture. At the detection of a stop gesture, audio or visual feedback indicates the successfully completed gesture.

Gestures may be broken into semantic components referred to as gesture components. A complete gesture may comprise one or more gesture components; the rules that define gesture components and their associations are generated by the 3D gesture interaction interface and stored as the 3D gesture interaction model. The associated rule may require that preconditions exist for a gesture component. The initial most component of an impending gesture is referred to as the "entry point". The entry point must meet minimum static and dynamic requirements to initiate the 3D gesture interaction interface's gesture mode. The controllable entry point requirements may be utilized for validating gesture intentionality and for the rejection of spurious gestures having identical static and dynamic features as one of the valid gestures. Immediately after the entry point, the gesture starts. For more detail on gesture components, refer to the patent application cited hereinabove.

Figure 4:
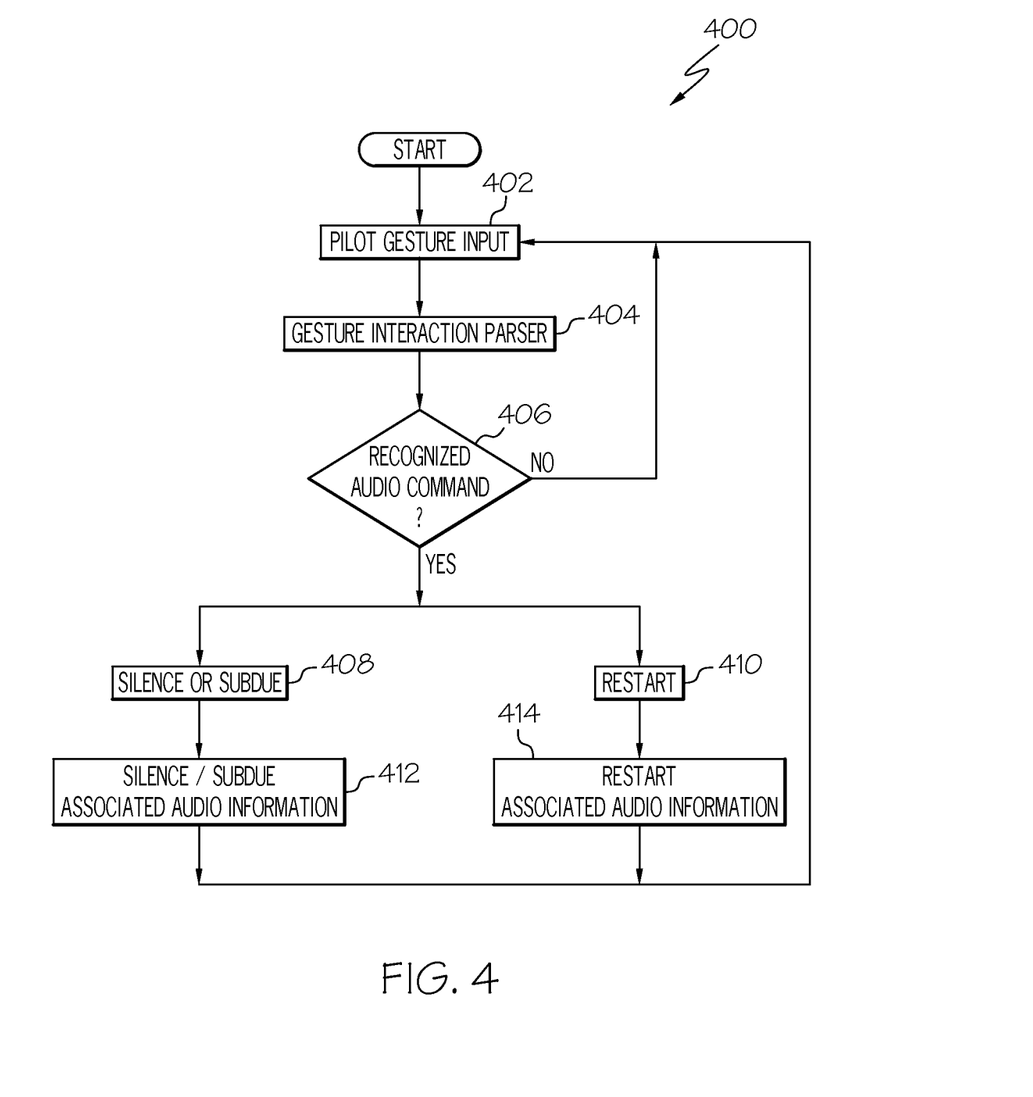
FIG. 4 is a flow chart of a of an audio gesture controller process in accordance with an embodiment.

FIG. 4 is a flow chart of a of an audio gesture controller process in accordance with an embodiment. Pilot gesture input is sensed in a valid gesture interaction volume (for example, 3D interaction volume 304) at STEP 402. At STEP 404 a gesture interaction parser within the gesture controller 102 identifies the static and dynamic aspects of the gesture and compares them against gesture interaction models stored in memory module 104. If the pilot gesture input is recognized to be a valid audio control gesture at STEP 406, the process associates the valid audio control gesture with one or more target audio devices according to an audio data priority scheme described below. In one embodiment, audio control gestures to silence or subdue audio data (STEP 408) follow a separate path from audio control gestures to restart audio data (STEP 410).

Priority checking compares a target audio device associated with an audio command from STEP 406 to a level of importance found in a predetermined audio data priority scheme. In response to the level of importance according to the priority scheme, the audio command may be filtered and applied to one or more audio devices. Priority checking includes, but is not limited to, assessing the available sources of audio data (audio sources) and assigning audio data priority to the various audio sources.

The predetermined audio data priority scheme may sort audio sources by importance (for example, certain weather warnings may have higher importance than certain intercom announcements), and may sort audio devices by direction or region (for example, forward and aft audio devices, and/or left side of aircraft and right side of aircraft). The predetermined audio priority scheme may be loaded into memory module 104 a priori, may be entered by the user 110 via a component of the user interfaces 112, and/or may be altered by the user via the user interfaces 112 at any time during operation of the avionics system. In one embodiment, STEP 408 and STEP 410 include priority checking according to a predetermined audio data priority scheme.

At STEP 412 an audio command is generated that, when applied to the target audio device, causes a silence/subdue of associated audio information from the audio device. At STEP 414, an audio command is generated that, when applied to the target audio device, causes the restart of associated audio information from the audio device. As mentioned above, an optional "timed silence" utilizes a predetermined amount of time for an audio silence/subdue command to endure, and when utilized, the audio device restarts generation of audio information without being prompted by a restart command. The gesture controller process continuously monitors pilot gesture input within the valid interaction volume.

Thus, there has been provided a 3D gesture based interface for controlling audio information in flight deck applications. By adding a set of simple, intuitive 3D gestures to generate audio commands and apply them to audio devices, the system unburdens the pilot of searching the control panel for silence or cancel mechanisms for a given audio device.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method, executable by a processor, for gesture controlling a plurality of audio devices in an aircraft, the method comprising:
    sorting each audio device of the plurality of audio devices by (i) direction or region in the aircraft and (ii) importance of associated audio source;
    assigning a respective priority to each audio device of the plurality of audio devices responsive to the sorting;
    detecting a position and movement of a user's arm and hand relative to a valid interaction volume wherein detecting comprises creating a valid interaction volume in accordance with a position of at least one sensor;
    recognizing when a gesture performed within the valid interaction volume
        (i) meets a minimum static and dynamic requirement by an entry point gesture component, and
        (ii) indicates a valid audio control gesture; associating a target audio device of the plurality of audio devices with the valid audio control gesture;
    generating an audio control command for the target audio device consistent with the valid audio control gesture;
    determining a priority of the audio control command according to the respective priority of the target audio device; and
    based on the determined priority of the audio control command, applying the audio control command to the target audio device- and not to the remainder of the plurality of audio devices.

2. The method of claim 1, wherein the step of detecting further comprises sensing a position of the user's palm and fingers within the valid interaction volume.

3. The method of claim 1, wherein applying the audio control command to the target audio device comprises silencing or subduing the target audio device until expiration of a predetermined amount of time.

4. The method of claim 1, wherein applying the audio control command to the target audio device comprises silencing or subduing the target audio device until occurrence of a second audio control command to restart audio information from the target audio device.

5. The method of claim 1, wherein the step of recognizing comprises:
creating a three dimensional gesture interaction model comprising a plurality of rules, wherein the rules comprise one or more valid gesture components;
distinguishing, during a gesture made within the valid interaction volume, static and dynamic features of a palm and fingers;
parsing the static and dynamic features of the palm and fingers; and
comparing the static and dynamic features of the palm and fingers to rules defined in the three dimensional gesture interaction model.

6. A system for gesture controlling a plurality of audio devices in an aircraft, the system comprising:
a source of gesture interaction rules, wherein the rules comprise one or more valid gesture components;
a sensor; and
a processor coupled to the audio device, the source of gesture interaction rules, and the sensor, the processor configured to,
sort each audio device of the plurality of audio devices by (i) direction or region in the aircraft and (ii) importance of associated audio source;
assign a respective priority to each audio device of the plurality of audio devices responsive to the sorting;
detect a position and movement of a user's arm and hand relative to a valid interaction volume; determine when a minimum static and dynamic requirement has been met by an entry point gesture component; recognize when a gesture performed within a valid interaction volume indicates a valid audio control gesture; determine an audio control command and a target audio device of the plurality of audio devices consistent with the valid audio control gesture; determine a priority of the audio control command according to the predetermined audio data priority scheme; and based on the determined priority of the audio control command, apply the audio control command to the target audio device and not to the remainder of the plurality of audio devices.

7. The system of claim 6, wherein the processor is further configured to create the valid interaction volume in accordance with a position of the sensor.

8. The system of claim 6, wherein the processor is further configured to:
distinguish, during a gesture made within the valid interaction volume, static and dynamic features of a palm and fingers;
parse the static and dynamic features of the palm and fingers; and
compare the static and dynamic features of the palm and fingers to the gesture interaction rules.

9. A method, executable by a processor, for gesture controlling a plurality of audio devices in an aircraft, the method comprising:
constructing a valid interaction volume based on a position and location of at least one sensor;
recognizing when the static and dynamic movements of the user's palm and fingers within the valid interaction volume (i) meet a minimum static and dynamic requirement of an entry point gesture component, and (ii) indicate a valid audio control gesture;
sorting each audio device of the plurality of audio devices by (i) direction or region in the aircraft and (ii) importance of associated audio source;
assigning a respective priority to each audio device of the plurality of audio devices responsive to the sorting;
associating a target audio device of the plurality of audio devices with the valid audio control gesture;
determining an audio control command for the target audio device consistent with the valid audio control gesture and consistent with a predetermined audio data priority scheme;
and
based on a determined priority of the audio control command and priority of the target audio device, silencing or subduing the target audio device, and not silencing or subduing the remainder of the plurality of audio devices.

10. The method of claim 9, wherein sorting comprises sorting essential and non-essential audio information, based on audio source.

11. The method of claim 9, further comprising, ceasing the silencing or subduing upon expiration of a predetermined amount of time.

12. The method of claim 9, further comprising, ceasing the silencing or subduing upon occurrence of a restart audio control command.

13. The method of claim 9, wherein recognizing comprises:
creating a three dimensional gesture interaction model comprising a plurality of rules, wherein the rules comprise one or more valid gesture components;
distinguishing, during a gesture made within the valid interaction volume, static and dynamic features of a palm and fingers;
parsing the static and dynamic features of the palm and fingers; and
comparing the static and dynamic features of the palm and fingers to rules defined in the three dimensional gesture interaction model.

14. The method of claim 6, wherein the audio control command to the target audio device comprises silencing or subduing the target audio device, and the processor is further configured to silence or subdue the target audio device until expiration of a predetermined amount of time.

15. The method of claim 6, wherein the audio control command to the target audio device comprises silencing or subduing the target audio device, and the processor is further configured to silence or subdue the target audio device until occurrence of a subsequent audio control command to restart audio information from the target audio device.

16. The method of claim 8, wherein the audio control command to the target audio device comprises silencing or subduing the target audio device, and the processor is further configured to silence or subdue the target audio device until expiration of a predetermined amount of time.

17. The method of claim 8, wherein the audio control command to the target audio device comprises silencing or subduing the target audio device, and the processor is further configured to silence or subdue the target audio device until occurrence of a subsequent audio control command to restart audio information from the target audio device.

* * * * *